US012748655B2

(12) United States Patent
Kiss

(10) Patent No.: US 12,748,655 B2
(45) Date of Patent: Sep. 29, 2026

(54) METHOD AND APPARATUS FOR CROSS-DIE RESET CONTROL

(71) Applicant: Arm Limited, Cambridge (GB)

(72) Inventor: Gergely Kiss, Budapest (HU)

(73) Assignee: Arm Limited, Cambridge (GB)

( * ) Notice: Subject to any disclaimer, the term of this patent is extended or adjusted under 35 U.S.C. 154(b) by 121 days.

(21) Appl. No.: 18/944,294

(22) Filed: Nov. 12, 2024

(65) Prior Publication Data

US 2026/0133870 A1 May 14, 2026

(51) Int. Cl.
*G06F 11/07* (2006.01)
*G06F 9/52* (2006.01)

(52) U.S. Cl.
CPC ............ *G06F 11/0793* (2013.01); *G06F 9/52* (2013.01)

(58) Field of Classification Search
CPC ............................... G06F 11/0793; G06F 9/52
See application file for complete search history.

(56) References Cited

U.S. PATENT DOCUMENTS

2022/0221893 A1* 7/2022 Wang .................... H03L 7/0805
2023/0058989 A1* 2/2023 Hammarlund ...... G06F 12/0831
2023/0069294 A1* 3/2023 Agarwal ............... H10W 70/65

* cited by examiner

*Primary Examiner* — Jigar P Patel
(74) *Attorney, Agent, or Firm* — Leveque Intellectual Property Law, P.C.

(57) ABSTRACT

A reset generation manager (RGM) of a first die, of a data processing system with two or more dies, has a local state and is configured to observe a remote state of an RGM of at least one second die of the data processing system. The RGM of the first die is configured to transition the local state to a next state when the local state lags the remote state and wait for the remote state to catch up to the local state when the local state leads the remote state. A recovery action may be performed when the remote state is out of synchronization with the local state, or when the RGM of the first die remains in a non-functional state for too long. Operating states of the RGM may include a first functional state, a first resetting state, a second functional state, and a second resetting state.

20 Claims, 4 Drawing Sheets

200

METHOD AND APPARATUS FOR CROSS-DIE RESET CONTROL

BACKGROUND

A data processing system may include multiple integrated circuit dies, also called chiplets, that are coupled together in a package to provide a functional system. The dies may communicate via an interconnect. The interconnect may conform to a standard protocol, such as the Universal Chiplet Interconnect Express (UCIe) protocol, which enables communication between dies from different manufacturers, for example.

For reliable cooperation between two independent dies, it is desirable that the reset entry and exit states of independent dies are coordinated or synchronized.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

DETAILED DESCRIPTION

The various apparatus and methods described herein provide mechanisms for cross-die reset control in a multi-die data processing system.

A data process system may include multiple integrated circuit dies or chiplets that are coupled together in a package to provide a functional system.

Figure 1:
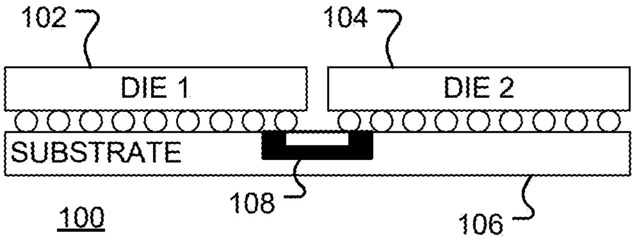
FIG. 1 is a diagrammatic representation of a data processing system, in accordance with various representative embodiments.

FIG. 1 is a diagrammatic representation of data processing system 100, in accordance with various representative embodiments. Data processing system 100 includes first die 102 and second die 104. The dies are coupled to common substrate 106. The dies may be packaged together in other ways. For example, the dies could be stacked and connected through vias. In the simplified embodiment shown in FIG. 1, the dies are coupled via multi-wire interconnect 108. In a further embodiment, a wireless interface is used. In general, data processing system 100 may include two or more dies. A die may be connected to one or more other dies.

Interconnect 108 may include a connection that conforms to a standard protocol, such as the Universal Chiplet Interconnect Express (UCIe) protocol. This enables communication between dies from different manufacturers, for example, and allows interoperability of the dies. For example, the dies may be chiplets that operate together in an equivalent manner to a larger single-chip system. In accordance with embodiments of the present disclosure, interconnect 108 may also include a cross-die links for synchronization or coordination of reset entry and exit states between the first and second dies using a reset generation manager (RGM). The reset generation manager logic block and the associated communication protocol are symmetric in that both dies play the same role, with no manager-subordinate relation. This enables the same logic design to be implemented on both dies.

Embodiments enable the cross-die interconnect between reset generation managers on separate dies to be implemented using a minimum number of wires. A reset generation manager on one die may be connected to reset managers on one or more other dies.

Communication between reset generation managers may be asynchronous, so no common clock is needed, and the interface can operate with asynchronous or meso-synchronous clocks on the separate dies.

In one embodiment, the two or more dies are packaged together as a multi-chip module. In addition, the multi-chip module may contain a common reset circuit, such as a Power-on Reset (PoR) circuit.

In one embodiment, RGMs on the two or more dies are coupled via a two-bit cross-die interfaces. Operating states of the RGM are Gray coded in the interface and can only be changed by one-bit at a time. The operating states are not independent but are configured to follow each other. That is, local and remote states move hand-in-hand. The two-bit cross-die interface indicate reset states that provide a point of synchronization for reset operations, where one RGM needs to wait for the other RGM(s) to catch up before proceeding to a next state.

The remote and the local states are constrained to be no more than one state apart. If more than one state apart, a fault condition is triggered.

In one embodiment, from the perspective of one RGM, operation is as follows:

Both local and remote RGMs start in a first functional state, designated as state 00. When a local reset condition occurs, the local RGM enters a first resetting state, designated as state 01, provided that the remote RGM was observed in the same state (00). Otherwise, the local RGM waits for the remote RGM to catch up. In addition, if the remote RGM is observed in the next state (01), the local RGM follows it and enters the next state (01). This ensures that both remote and local RGMs perform resets before entering the second functional state 11.

In state 01, the local RGM waits until the remote is observable in the same state (01) or the next state (11), and then proceeds to second functional state (11).

In state 11, the local RGM behaves in similar manner to state 00. When a local reset condition occurs, the local RGM enters a second resetting state, designated as state 10, provided that the remote RGM was observed in the same state (11). Otherwise, the local RGM waits for the remote RGM to catch up. In addition, if the remote RGM is observed in the next state (10), the local RGM follows it and enters the next state (10), which is the second resetting state. This ensures that both remote and local RGMs perform resets before entering the second functional state 11.

In state 10, the local RGM behaves in an equivalent manner to state 01. The local RGM waits in state 10 until the remote is observable in the same state (10) or the next state (00), and then proceeds to first functional state (00).

Operation of the RGMs is described in more detail below, with reference to FIGS. 2-5. It is noted that a system of the present disclosure may contain more than two connected dies. In such a case, a die waits for all other connected dies to catch up before proceeding to a next state. Also, a die proceeds to the next state if any of the other connected dies is observed to move to the next state. In addition, it is to be recognized that an RGM may have more than four states. For example, a resetting state may contain a number of sub-states that are entered based on the type of local reset that occurs. The states may be indicated by an indicator having more than two bits. For example, up to eight different states may be indicted by a three-bit indicator.

Figure 2:
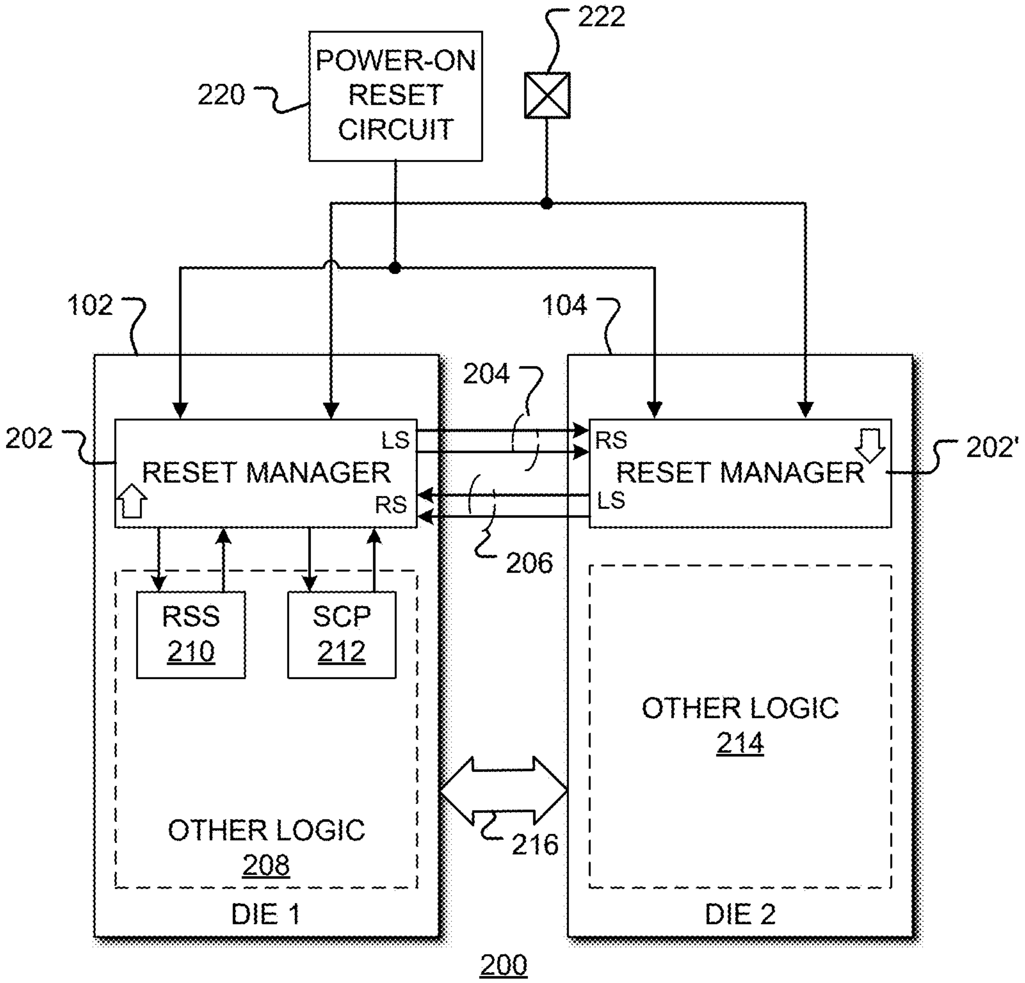
FIG. 2 is a block diagram of a data processing system, in accordance with various representative embodiments.

FIG. 2 is a block diagram of a data processing system 200, in accordance with various representative embodiments. First die 102 includes reset generation manager (RGM) 202 and second die 104 includes corresponding reset generation manager (RGM) 202'. RGM 202 and corresponding RGM 202' may be implemented in electronic circuits using the same modular design. For example, they may be fabricated based on the same Intellectual Property (IP) block.

Without loss of generality, and for ease of explanation, first die 102 will be referred to as the "local" die, and second die 104 will be referred to as the "remote" die. It is to be understood that, in general, there may be more than one remote die. The reset generation managers are coupled by cross-die link 204 from local die 102 to remote die 104. This link is used to enable the remote RGM to observe the state of the local RGM, referred to as the local state (LS), to the remote die. The reset generation managers are also coupled by cross-die link 206 from remote die 104 to local die 102. This link is used to enable to local RGM to observe the state of the remote RGM, referred to as the remote state (RS).

Local die 102 includes additional logic 208. Local die 208 may include a trust sub-system. In the embodiment shown, the trust sub-system includes Runtime Security Subsystem (RSS) 210 and System Control Processor (SCP) 212. RSS 210 serves as a Root of Trust for the die. The RSS provides an isolated environment that offers critical platform security services including holding and protection sensitive assets in the system. The RSS may offer a Secure Boot service, for example. SCP 212 is a processor-based capability that provides a flexible and extensible platform for provision of power management functions and services. The primary purpose of the SCP is the initialization and power control of components within the die. The SCP may provide boot and system start-up services, security integrity and initial configuration. The SCP may also manage clocks, voltage regulators and associated operating points, to support Dynamic Voltage and Frequency Scaling. In addition, the SCP may provide power state management for the power regions within the local die. Both the RSS and the SCP are coupled to the reset generation manager and participate in reset operations.

Remote die 104 may also include other logic 214 in addition to reset generation manager 202'.

In the embodiment shown, first die 102 and second die 104 communicate via interconnect 216. The interconnect may conform to a standard protocol, such as the Universal Chiplet Interconnect Express (UCIe) protocol, which enables communication between dies from different manufacturers, for example. For example, first die 102 fabricated or designed by one manufacturer may be a compute die that includes one or more processing cores, while second die 104 may be a companion fabricated or designed by another manufacturer.

For reliable cooperation between two independent dies, it is desirable that operation of the two independent dies is coordinated or synchronized. In particular, for reliable cooperation between two independent dies, it is desirable that the reset entry and exit states of the two independent dies are coordinated or synchronized. This is role of the reset generation managers (RGMs) 202 and 202'.

Figure 3:
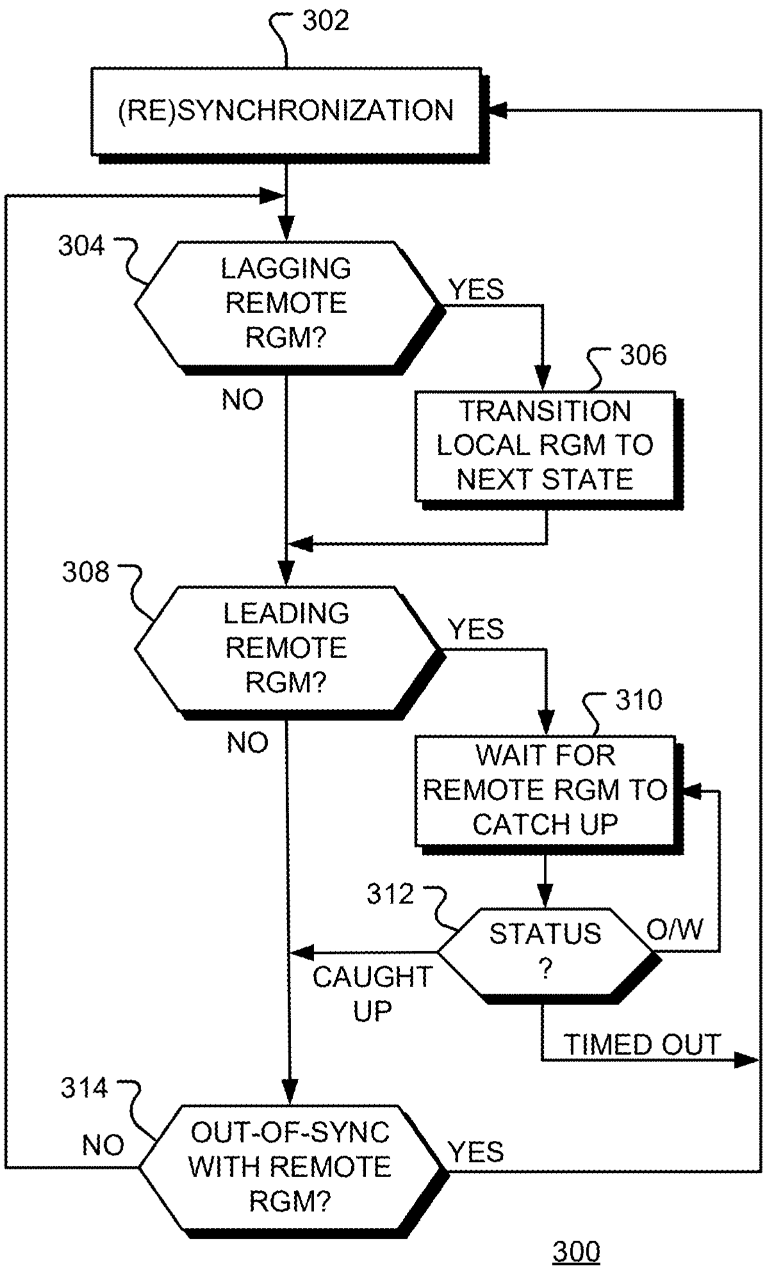
FIG. 3 is a flow chart of a method, in accordance with various representative embodiments.

FIG. 3 is a flow chart of a method, 300, in accordance with various representative embodiments. FIG. 3 shows how local states of a local RGM can be synchronized with remote states of one or more remote RGMs. It is assumed that all RGMs cycle through the same set of operating states. The local RGM is said to be lagging a remote RGM if the current local state is the state immediately before the current remote state in the cycle of states. Similarly, the local RGM is said to be leading a remote RGM if the current local state is the state immediately after the current remote state in the cycle of states. All RGMs are synchronized at block 302. This may be done, for example, by using a power-on reset, or some other reset that is common to all RGMs. The local RGM observes the states of the remote RGMs through the cross-die links, as discussed above. If the local state is lagging any remote state, as depicted by the positive branch from decision block 304, the local RGM catches up by transitioning to the next state, at block 306, and flow continues to decision block 308. If not, as depicted by the negative branch from decision block 306, flow continues to decision block 308. If the local state is leading a remote state, as depicted by the positive branch from decision block 308, the local RGM waits for all of the remote RGMs to catch up at block 310. The wait may be timed to prevent deadlock. If all of the remote RGM catch up to the same state of the local RGM, as depicted by the "CAUGHT UP" branch from status block 312, flow continues to decision block 314. If the timer expires before all remote RGMs catch up, as depicted by the "TIMED OUT" branch from status block 312, flow returns to block 302, and the RGMs are re-synchronized. Otherwise, as depicted by the "O/W" branch from status block 312, flow returns to block 310. If the observed state of any remote RGM is out of synchronization with the local RGM, as depicted by the positive branch from decision block 314, flow returns to block 302, and the RGMs are re-synchronized. The RGMs are observed to be out of synchronization if the local RGM lags or leads the remote RGM by more than one state. If the RGMs are not out of synchronization, as depicted by the negative branch from decision block 314, flow return to decision block 304. The state of the local RGM may be changed either to follow the state of a remote RGM or in response to a local event, such as a local reset.

A feature of the method, described above with reference to FIG. 3, is that there must be at least four states in the cycle of states in order to distinguish between lagging, leading and out-of-synchronization. Conventionally, a system reset has only two states: a stable state associated with normal function, or a transitory state associated with the process of resetting. In accordance with an embodiment of the present disclosure, a reset generation manager provided with at least four states—first and second functional states and first and second resetting states. This enable synchronization as described above with reference to FIG. 3.

An RGM may be implemented as a state machine circuit and is included in a first (local) die and a second (remote) die. The remote die may be in the same package as the local die, but is a distinct integrated circuit. The two RGMs operate in an equivalent manner, and the protocol for communication between them is symmetric. An RGM has four operating states that may be indicated by a two-bit state indicator: a first functional state (00), a first resetting state (01), a second functional state (11) and a second resetting state (10). The indicators follow a Gray code, meaning that as the RGM cycles from one state to the next, only one bit of the indicator changes. This is advantageous when a state is signal on a simple two-wire interface since the signal is robust in the presence of timing skew when setting or reading the levels of the two signals.

Figure 4:
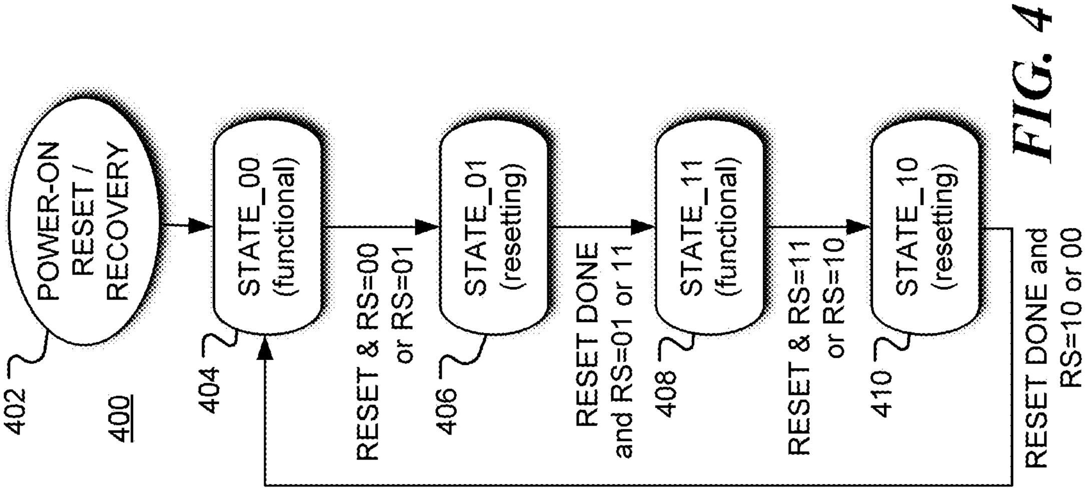
FIG. 4 is a state flow diagram of a reset generation manager of an integrated circuit die, in accordance with various representative embodiments.

FIG. 4 is a state flow diagram 400 of a reset generation manager (RGM) of a first integrated circuit die, in accordance with various representative embodiments. The RGM is referred to as the local RGM and is coupled to a remote RGM of a second die by a cross-die link. This link enables the local RGM to observe the operating state of the remote RGM on the second die and vice versa. This state of the remote RGM is referred to as the remote state (RS). At block 402, the RGM is reset by a common reset operation, such as a power-on reset. This resets both the local and remote RGMs, ensuring they start in the same state. The local RGM enters the first functional state 404 (STATE_00). The local RGM remains in this state until either (a) the RGM receives a local reset request ("RESET") and the remote RGM is still in state 00, or (b) it observes that the remote state has changed to state 01, indicating that the remote RGM is performing a local reset operation. These events may occur separately or together. The local RGM transitions to the first resetting state (STATE_01) 406. When the reset operation is complete, the local RGM transitions to the second functional state (STATE_11) 408—provided that the remote RGM is in state 01 or state 11. The local RGM remains in this state until either (a) the RGM receives a local reset request ("RESET") and the remote RGM is still in state 11, or (b) it observes that the remote state has changed to state 10, indicating that the remote RGM is performing a local reset operation. The local RGM transitions to the second resetting state (STATE_10) 410. When the reset operation is complete, the local RGM transitions back to the first functional state (STATE_00) 404—provided that the remote RGM is in state 10 or 00. This completes the cycle of states.

Thus, when a local state is the first functional state and the remote state is observed in the first functional state, the local RGM transitions the local state to the first resetting state and initiating a reset operation in the first die responsive to a reset event on the first die.

When a local state is the first functional state and the remote state is observed in the first resetting state, the local RGM transitions the local state to the first resetting state and initiates a reset operation in the first die.

When the local state is the first resetting state the local RGM transitions the local state to the second functional state when the reset operation is completed and the remote RGM is in the first resetting state or the second functional state.

When the local state is the second functional state and the remote state is observed in the second functional state, the local RGM transitions the local state to the second resetting state and initiating a reset operation in the first die responsive to a reset event on the first die.

When the local state is the second functional state and the remote state is observed in the second resetting state, the local RGM transitions the local state to the second resetting state and initiating a reset operation in the first die.

When the local state is the second resetting state the local RGM transitions the local state to the first functional state when the reset operation is completed and the remote RGM is in the second resetting state or the first functional state.

It is noted that the local RGM does not respond to a local reset request if the remote RGM is lagging—i.e., has not caught up with a previous state transition.

In normal operation, the local and remote RGMs should be in the same state, lagging by one state (catching up) or leading by one state (waiting). Separation by two states is an indication of an error. When this condition is observed, a recovery action, such as power-on reset or some other shared reset, is performed.

Figure 5:
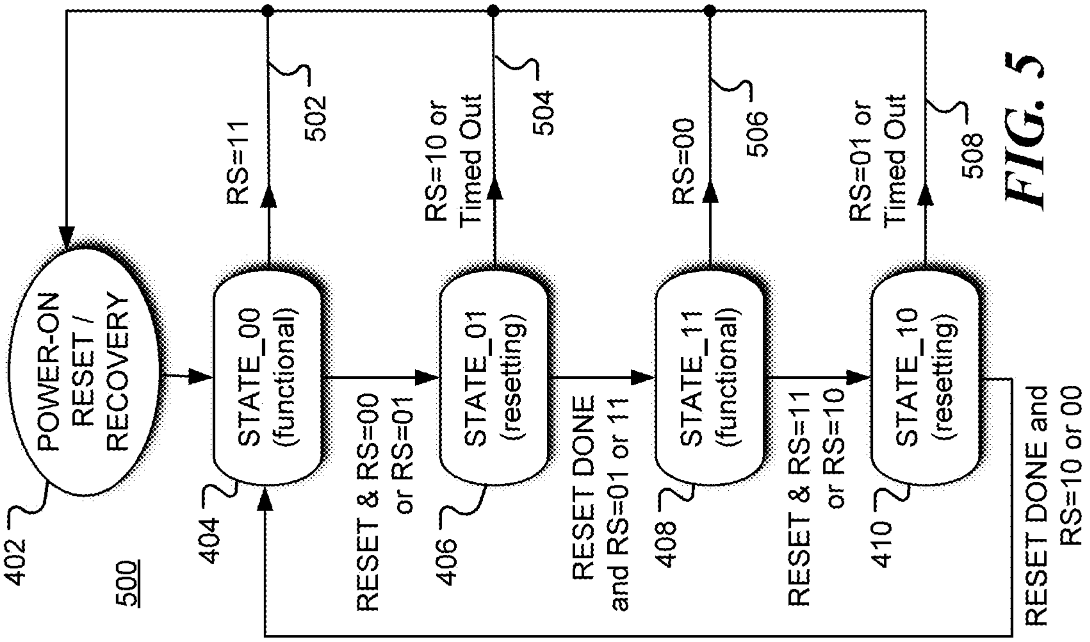
FIG. 5 is a further state flow diagram of a reset generation manager of an integrated circuit die, in accordance with various representative embodiments.

FIG. 5 is a state-flow diagram 500 of a reset generation manager (RGM) of a first integrated circuit die, in accordance with various representative embodiments. The state-flow diagram shows error conditions that can trigger a recovery action. Specifically, a recovery action is performed when:

- the local state is the first functional state 404, and the remote state is observed in the second functional state (RS=11), (transition 502),
- the local state is the first resetting state 406, and the remote state is observed in the second resetting state (RS=10), (transition 504),
- the local state is the second functional state 408, and the remote state is observed in the first functional state (RS=00), (transition 506), or
- the local state is the second resetting state 410, and the remote state is observed in the first resetting state (RS=01) (transition 508).

In addition, error conditions may be generated when an RGM has been in a resetting state for too long. In one embodiment, a timer is initialized to a designated value when the RGM enters the first or second resetting state, and a time-out (TO) error condition is generated when the timer expires. The initial timer value may be programmable via a register, for example. Thus, a time-out (TO) error condition is generated when:

- The local state has been in the first resetting state 406 (LS=01) for longer than a designated first time period, (transition 504),
- The local state has been in the second resetting state 410 (LS=10) for longer than a designated first time period, (transition 508).

Corresponding error conditions are generated by the remote RGM.

Figure 6:
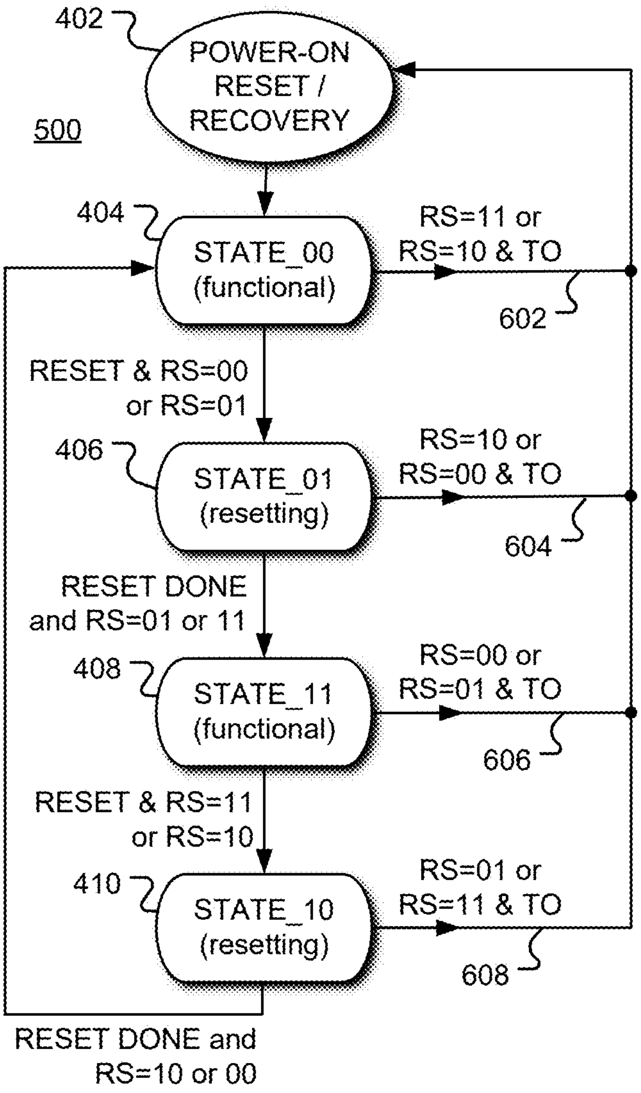
FIG. 6 is a further state flow diagram of a reset generation manager of an integrated circuit die, in accordance with various representative embodiments.

In a further embodiment, shown in FIG. 6, additional error conditions are generated when the remote RGM has been in a lagging state for too long. In one embodiment, a local timer is initialized to a designated value when the local RGM leads in transitioning to a new state and a time-out (TO) error condition is generated when the timer expires. The initial timer value may be programmable via a register, for example. Thus, a time-out (TO) error condition is generated when:

- the local state is the first functional state 404, and the remote state has been observed in the second resetting state (RS=10) for longer than a designated first time period, (transition 602),
- the local state is the first resetting state 406, and the remote state has been observed in the first functional state (RS=00) for longer than a designated second time period, (transition 604),
- the local state is the second functional state 408, and the remote state has been observed in the first resetting state (RS=01) for longer than a designated third time period, (transition 606), or the local state is the second resetting state 410, and the remote state has been observed in the second functional state (RS=11) for longer than a designated fourth time period, (transition 608).

In summary, embodiments of the present disclosure provide apparatus comprising a first die that includes an input to couple to an output of a second die, an output to couple to an input of the second die, and a reset generation manager (RGM). In operation, the RGM is a circuit or logic block that has a local state and is configured to observe, at the input, a remote state, where the remote state is an operating state of a reset generation manager of the second die. The local RGM transitions to a next state when the local state is lagging the remote state, and wait for the remote state to catch up to the local state when the local state is leading the remote state. In addition, the local RGM initiates a recovery action when the remote state is out of synchronization with the local state or when the RGM remains in a non-functional state, such as a resetting state, for too long.

In one embodiment, the reset generation manager is a circuit operable in a first functional state, a first resetting state, a second functional state, and a second resetting state.

When the local state is the first functional state and the remote state is observed in the first functional state, the local RGM transitions to the first resetting state and initiates a reset operation in the first die responsive to a reset condition on the first die; and When the local state is the first functional state and the remote state is observed in the first resetting state, the local RGM transitions to the first resetting state and initiate a reset operation in the first die.

When the local state is the first resetting state, the local RGM transition the local state to the second functional state in response to completion of the reset operation in the first die, provided the remote state is observed in the first resetting state or the second functioning state;

When the local state is the second functional state and the remote state is observed in the second functional state, the local RGM transitions to the second resetting state and initiates a reset operation in the first die responsive to a reset condition on the first die.

When the local state is the second functional state and the remote state is observed in the second resetting state, the local RGM transitions to the second resetting state and initiates a reset operation in the first die.

When the local state is the second resetting state, the local RGM transitions to the first functional state in response to completion of the reset operation in the first die, provided the remote state is observed in the second resetting state or the first functioning state.

The local RGM and the remote RGM are determined to be out of synchronization when the local state is lagging or leading by more than one state. For example, when the local state is the first functional state, and the remote state is observed in the second functional state, the local state is the first resetting state, and the remote state is observed in the second resetting state, the local state is the second functional state, and the remote state is observed in the first functional state, or the local state is the second resetting state, and the remote state is observed in the first resetting state.

In one embodiment, the reset generation manager is configured to perform a recovery action, such as a common reset, when the local RGM remains in a resetting state for longer than a designated time period.

The input may be configured to receive an indicator of the remote state having two or more bits. Similarly, the output may be configured to provide an indicator of the local state having two or more bits. The reset generation manager may be configured to change only a single bit of the indicator of the local state when it transitions to the next local state.

Various embodiments of the present disclosure provide a method for controlling reset operations in a data processing system having a first die and a second die. In accordance with the method, a local reset generation manager (RGM) of the first die, having a local state of operation, observes, as a remote state, an operating state of a remote reset generation manager (RGM) of the second die. When the local state lags the remote state the local RGM transitions to a next state. When the local state leads the remote state, the local RGM waits for the remote RGM to catch up and may trigger a common reset of the first and second dies if the remote state fails to catch up to the local state in a designated time period.

When the remote state is out of synchronization with the local state the first and second dies are resynchronized by performing a recovery action.

Various embodiments of the disclosure provide a non-transitory computer-readable medium containing instructions for fabrication of a reset generation manager (RGM) in a first integrated circuit die. In operation, the RGM has a local state and is configured to observe a remote state. The remote state is an operating state of a reset generation manager of a second die. The RGM transitions the local state to a next state when the local state lags the remote state, and waits for the remote state to catch up to the local state when the local state leads the remote state.

The RGM may be configured to perform a recovery action, such as a common reset, when the local state is out of synchronization with the remote state, or when the local state has been in a non-functional state for longer than a designated period of time.

As described above, in one embodiment the local state includes a first functional state, a first resetting state, a second functional state, and a second resetting state. In this embodiment, the first and second resetting states are non-functional states.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

In this document, relational terms such as first and second, top and bottom, and the like may be used solely to distinguish one entity or action from another entity or action without necessarily requiring or implying any actual such relationship or order between such entities or actions. The terms “comprises,” “comprising,” “includes,” “including,” “has,” “having,” or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioral representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted, without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An apparatus comprising two or more dies:
- a first die of the two or more dies including:
  - an input to couple to an output of a second die of the two or more dies;
  - an output to couple to an input of the second die; and
  - a reset generation manager (RGM),
- where, in operation, the RGM of the first die has a local state and is configured to:
  - observe, at the input of the first die, a remote state, where the remote state is an operating state of a reset generation manager of the second die;
  - transition the local state to a next state when the local state lags the remote state; and
  - wait for the remote state to catch up to the local state when the local state leads the remote state.

2. The apparatus of claim 1, where the RGM of the first die is configured to initiate a recovery action when:
- the local state is out of synchronization with the remote state of the reset generation manager of the second die;
- the local state leads the remote state for longer than a first designated time period; or
- the local state remains in a non-functional state for longer than a second designated time period.

3. The apparatus of claim 2, where the recovery action includes a reset common to the first and second dies.

4. The apparatus of claim 1, where the RGM of the first die is operable in a first functional state, a first resetting state, a second functional state, and a second resetting state, and is configured to:
- when the local state is the first functional state:
  - when the remote state is observed in the first functional state, transition the local state to the first resetting state and initiate a reset operation in the first die responsive to a reset condition on the first die; and
  - when the remote state is observed in the first resetting state, transition the local state to the first resetting state and initiate a reset operation in the first die;
- when the local state is the first resetting state:
  - responsive to completion of the reset operation in the first die, transition the local state to the second functional state, provided the remote state is observed in the first resetting state or the second functioning state;
- when the local state is the second functional state:
  - when the remote state is observed in the second functional state, transition the local state to the second resetting state and initiate a reset operation in the first die responsive to a reset condition on the first die; and
  - when the remote state is observed in the second resetting state, transition the local state to the second resetting state and initiate a reset operation in the first die; and
- when the local state is the second resetting state:
  - responsive to completion of the reset operation in the first die, transition the local state to the first functional state, provided the remote state is observed in the second resetting state or the first functioning state.

5. The apparatus of claim 4, where the RGM of the first die is further configured to perform a recovery action when the remote state is observed to be out of synchronization with the local state, where the local state and the remote state are out of synchronization when:
- the local state is the first functional state, and the remote state is observed in the second functional state;
- the local state is the first resetting state, and the remote state is observed in the second resetting state;
- the local state is the second functional state, and the remote state is observed in the first functional state; or
- the local state is the second resetting state, and the remote state is observed in the first resetting state.

6. The apparatus of claim 4, where the RGM of the first die is further configured to perform a recovery action when the RGM of the first die remains in a resetting state for longer than a designated time period.

7. The apparatus of claim 1, further comprising:
- a first interconnect that couples between the input of the first die and the output of the second die; and
- a second interconnect that couples between the output of the first die and the input of the second die.

8. The apparatus of claim 1, further comprising:
- a common reset circuit coupled to the reset generator manager of the first die and to the reset generator manager of the second die,
- where the reset generator managers of the first and second dies are both configured to enter the same state following a common reset.

9. The apparatus of claim 1, where the input of the first die is configured to receive an indicator of the remote state of the reset generation manager of the second die having two or more bits, and the output is configured to provide an indicator of the local state having two or more bits.

10. The apparatus of claim 9, where the RGM of the first die is configured to change only a single bit of the indicator of the local state responsive to a transition in the local state.

11. The apparatus of claim 1, where the first die also includes a trust sub-system responsive to the RGM of the first die and the reset operation includes resetting the trust sub-system.

12. A method for controlling reset operations in a data processing system having two or more dies, the method comprising:
- a local reset generation manager (RGM) of a first die of the two or more dies, having a local state of operation, and observing, as a remote state, an operating state of a remote reset generation manager (RGM) of a second die of the two or more dies;
- when the local state lags the remote state:
  - the local RGM transitioning to a next state; and
- when the local state leads the remote state:
  - waiting for the remote state fails to catch up to the local state.

13. The method of claim 12, further comprising resetting the first and second dies when:

the local state is out of synchronization with the remote state of the remote reset generation manager;

the local state leads the remote state for longer than a first designated time period; or the local state remains in a non-functional state for longer than a second designated time period.

14. The method of claim 12, where the local state is one of a first functional state, a first resetting state, a second functional state and a second resetting state, the method further comprising:

when the local state is a first functional state:

when the remote state is observed in the first functional state, transitioning the local state to the first resetting state and initiating a reset operation in the first die responsive to a reset event on the first die;

when the remote state is observed in the first resetting state, transitioning the local state to the first resetting state and initiating a reset operation in the first die;

when the local state is the first resetting state:

responsive to completion of the reset operation in the first die, transitioning the local state to the second functional state, provided the remote state is observed in the first resetting state or the second functioning state;

when the local state is the second functional state:

when the remote state is observed in the second functional state, transitioning the local state to the second resetting state and initiating a reset operation in the first die responsive to a reset event on the first die;

when the remote state is observed in the second resetting state, transitioning the local state to the second resetting state and initiating a reset operation in the first die;

when the local state is the second resetting state:

responsive to completion of the reset operation in the first die, transitioning the local state to the first functional state, provided the remote state is observed in the second resetting state or the first functioning state.

15. The method of claim 12, further comprising performing a recovery action when:

the local state is the first functional state, and the remote state is observed in the second functional state;

the local state is the first resetting state, and the remote state is observed in the second resetting state;

the local state is the second functional state, and the remote state is observed in the first functional state;

the local state is the second resetting state, and the remote state is observed in the first resetting state; or the local state is the first functional state, and the remote state has been observed in the second resetting state for longer than a designated first time period.

16. The method of claim 15, further comprising performing a recovery action when the local RGM remains in a resetting state for longer than a designated time period.

17. The method of claim 15, further comprising performing a recovery action when:

the local state is the first resetting state, and the remote state has been observed in the first functional state for longer than a designated second time period;

the local state is the second functional state, and the remote state has been observed in the first resetting state for longer than a designated third time period; or the local state is the second resetting state, and the remote state has been observed in the second functional state for longer than a designated fourth time period.

18. A non-transitory computer-readable medium containing instructions for fabrication of a reset generation manager (RGM) in a first integrated circuit die, where, in operation, the RGM has a local state and is configured to:

observe a remote state, where the remote state is an operating state of a reset generation manager of a second die;

transition the local state to a next state when the local state lags the remote state; and wait for the remote state to catch up to the local state when the local state leads the remote state.

19. The non-transitory computer-readable medium of claim 18, where the local state includes a first functional state, a first resetting state, a second functional state, and a second resetting state, and where the RGM of the first integrated circuit die is further configured to:

when the local state is the first functional state:

when the remote state is observed in the first functional state, transition the local state to the first resetting state and initiate a reset operation in the first die responsive to a reset event on the first die; and when the remote state is observed in the first resetting state, transition the local state to the first resetting state and initiate a reset operation in the first die;

when the local state is the first resetting state:

responsive to completion of the reset operation in the first die, transition the local state to the second functional state, provided the remote state is observed in the first resetting state or the second functioning state;

when the local state is the second functional state:

when the remote state is observed in the second functional state, transition the local state to the second resetting state and initiate a reset operation in the first die responsive to a reset event on the first die; and when the remote state is observed in the second resetting state, transition the local state to the second resetting state and initiate a reset operation in the first die; and when the local state is the second resetting state:

responsive to completion of the reset operation in the first die, transition the local state to the first functional state, provided the remote state is observed in the second resetting state or the first functioning state.

20. The non-transitory computer-readable medium of claim 18, where the RGM of the first integrated circuit die is further configured to perform a recovery action when:

the local state is out of synchronization with the remote state; or the local state has been in a non-functional state for longer than a designated period of time.

* * * * *